Feb. 24, 1970     H. V. WILLIAMSON     3,497,012

METHOD AND APPARATUS FOR EXTINGUISHING FIRES

Filed May 18, 1967

Inventor
Hilding V. Williamson
By
Attorney

United States Patent Office 3,497,012
Patented Feb. 24, 1970

---

3,497,012
METHOD AND APPARATUS FOR EXTINGUISHING FIRES
Hilding V. Williamson, Chicago, Ill., assignor to Chemetron Corporation, Chicago, Ill., a corporation of Delaware
Filed May 18, 1967, Ser. No. 639,396
Int. Cl. A62c 3/00, 35/00
U.S. Cl. 169—1                 7 Claims

ABSTRACT OF THE DISCLOSURE

A fire extinguishing apparatus and method wherein a supply of liquid carbon dioxide is passed through a conduit installed in a heat exchange medium contained in a reservoir which promotes efficient heat transfer between the carbon dioxide and the medium. Carbon dioxide vapor passing from the coil is applied to a fire source at an elevated temperature and a reduced pressure without damaging objects which the vapor strikes due to freezing or moisture.

---

Figure 1:
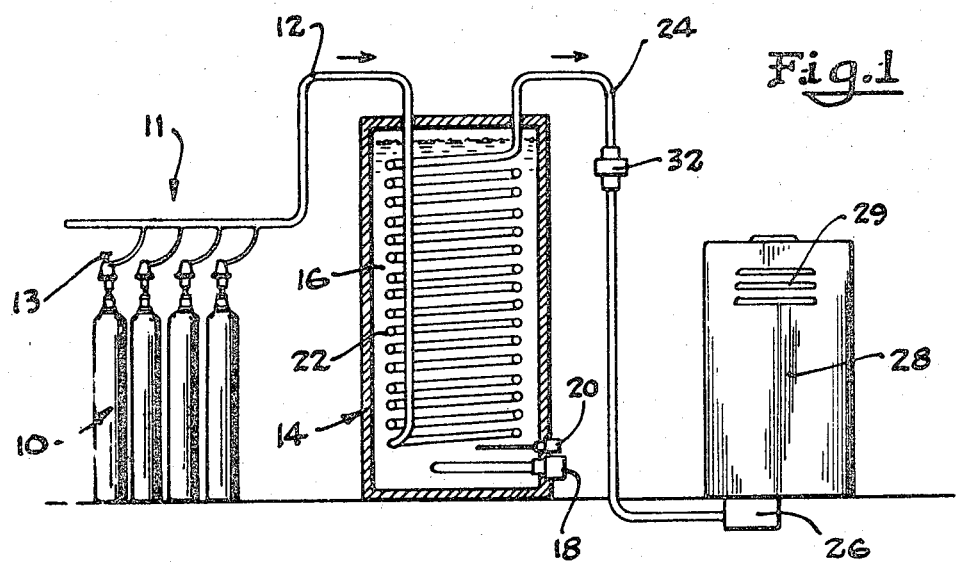

This invention relates in general to the extinguishment of fires and in particular to putting out fires with a gaseous extinguishing medium.

For some years, carbon dioxide has ben used successfully on hot fires because of its low temperature and cooling capacity. Ordinarily low temperature damage is insignificant because carbon dioxide does not wet the surfaces it falls on and also because it warms up quickly.

Recently the use of computers and other sensitive electronic equipment has become commonplace; a fire in such equipment is particularly difficult to extinguish. If carbon dioxide vapor is applied directly to the equipment at a reduced temperature in order to extinguish the fire, the refrigerating effects of the gas damage the delicate electronic components. There is a reduced possibility of damage if the entire room containing the equipment is protected by a mass application of carbon dioxide. That is, the cooling effect is negligible in all but the most unusual cases because the carbon dioxide is vaporized on contact with the floor and furnishings in the room rather than with the electronic equipment. However, the disadvantage of such a wholesale flooding technique is that the equipment to be protected frequently occupies only a small space in a much larger room. Further, with total flooding, the entire room must be evacuated, even though it is frequently highly desirable to continue operating portions of the equipment not subjected to the fire.

In the event that individual cabinets containing the electronic equipment are to be flooded with the carbon dioxide vapor using known methods of distribution, further problems arise. Because of the heat created during operation of the electronic components, the cabinets containing the equipment are ventilated; frequently forced air is blown into the cabinet to increase the circulation. Thus, a relatively high amount of carbon dioxide must be discharged at a relatively high rate to make up for the leakage rate from the cabinet. By discharging large quantities of carbon dioxide directly into the cabinet, many of the components are reduced to near dry ice temperatures, that is approximately to $-110°$ F. Temperature sensitive components comprising the electronic equipment are damaged by these low temperatures. Further, when the carbon dioxide atmosphere is replaced with room air after the flooding ceases, there is a tendency for the moisture content of the room air to condense on the subcooled surfaces. This condensed moisture causes electrical short circuits if the equipment is electrically energized before thorough drying. Such short circuits may precipitate further damage and require expensive repairs and/or replacement of parts.

It is an object of this invention to elevate the temperature of a liquid fire extinguishing medium, such as carbon dioxide, as it is passed through a conduit toward a fire source, so that the medium is discharged from the open end of the conduit in its vapor state and is at a sufficiently high temperature so as not to lower the temperature of objects it contacts at the source below their dew point.

A further object of this invention is to provide a heat exchange medium for elevating the temperature of liquid carbon dioxide which medium stores heat for many hours to provide standby heating in the event of a power failure.

A feature of this invention is to provide a fire extinguishing system for controlling the flow of the carbon dioxide and for improving the heat transfer characteristics of the heat exchange medium which is operated by the gas itself.

An additional object of this invention is to provide heat to a flowing gas at low cost and at a useful rate.

Yet another object of this invention is to deliver gas vapor to a fire source at proper temperature and pressure conditions and under sensitive control at relatively high flow rates.

Another object of this invention is to provide a reliable fire extinguishing system which is simply and inexpensively manufactured and maintained.

In accomplishing the foregoing objects and features, this invention provides a fire protection method and apparatus for use with delicate electronic equipment which is subject to damage by fire. A reserve supply of a gaseous fire extinguishing medium is maintained in liquid form and under pressure. The supply is connected to a conduit that is installed in a heat exchange reservoir which is heated and maintained at a control temperature. In the event of a fire, the liquid form of the fire extinguishing medium passes through the conduit in the reservoir wherein its pressure is reduced and its temperature is increased and thereafter the medium is applied to the fire source in its gaseous form. The final outlet pressure and temperature of the extinguishing medium is controlled in order to avoid freezing and/or moisture damage to delicate electronic equipment at or near the fire source.

Figures 1A, 2:
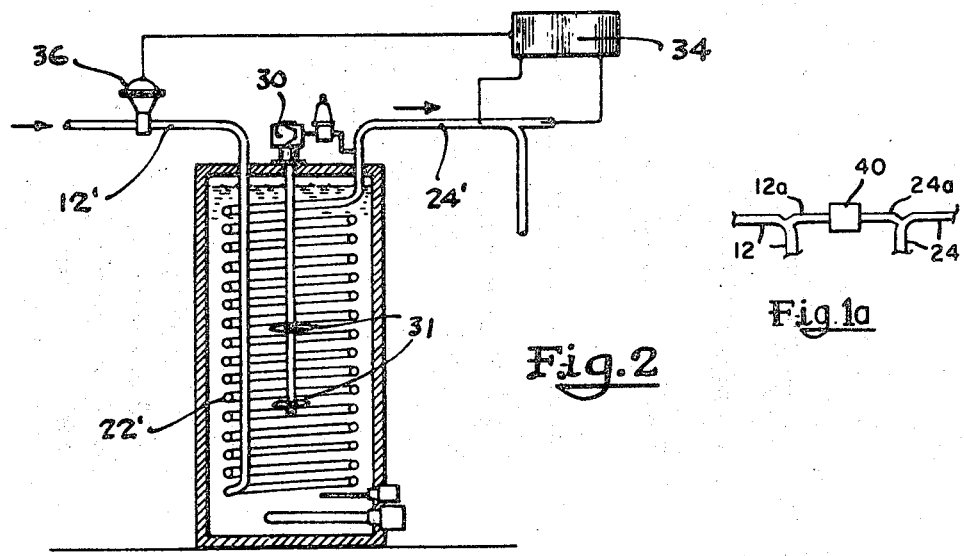

Further objects, as well as features and advantages of this invention will become apparent as the following description of an illustrated embodiment thereof proceeds and is given for the purpose of disclosure and is taken in conjunction wtih the accompanying drawings in which like character references designate like parts throughout the several views and where:

FIGURE 1 is an elevational view, partially in section, of fire extinguishing equipment incorporating the principles of this invention; FIGURE 1a is a fragmentary view illustrating a modification thereof; and FIGURE 2 is a vertical sectional view corresponding generally to FIGURE 1, but illustrating another embodiment of this invention.

Referring now to the several figures and first to FIGURE 1, means for storing a reserve supply of liquefied fire extinguishing medium, such as carbon dioxide at high pressure, is indicated at 10 as a bank of cylinders. Refrigeration equipment may be associated with suitable storage vessels to maintain the carbon dioxide at a low pressure and at a corresponding vapor pressure.

At least one of the cylinders is fitted with a handwheel 13 for direct manual actuation and release of the fire extinguishing medium upon discovery or detection of a fire. An easy partial turn of the wheel is sufficient to release the pressure and initiate discharge of the system. Remote detection means may be connected to the cylinders in conventional manner to automatically actuate and energize the system.

The carbon dioxide from the cylinders 10 is discharged through a manifold 11 into a conduit 12 for delivery to a heat exchange reservoir 14. Once the system is actuated, manifold pressure then operates all the other connected cylinder heads. The reservoir 14 which contains a heat exchange medium, such as water 16, is heated to a preselected control temperature and is maintained heated. To minimize the loss of heat, the reservoir is preferably insulated. Thus, the reservoir provides many hours of standby heat reserve in the event of power failure or the breakdown of other means for adding heat to the reservoir. While an electrically operated immersion heater 18 is employed to bring the water up to and maintain it at an operating temperature, other suitable heating means may be used. For example, steam could automatically be injected into the water to maintain its temperature at the selected level. Direct steam heating also has the advantage of supplying make-up water into the reservoir which might otherwise be lost by evaporation. An automatic thermostat 20 is connected to and controls the heater 18 in order to maintain the water at the desired temperature. A portion 22 of the conduit is coiled and is submerged in the heat exchange medium 16. By coiling the conduit, a greater length of conduit can be installed in a relatively small volume of water with accompanying savings in space and expense. The use of an indirect heat exchange means, such as the water reservoir, maintains both temperature and pressure stability over a wide flow range. The fact that all of the heat required for vaporization of the carbon dioxide is stored in the water makes the operation of the system independent of electrical power during the fire extinguishment.

The total vaporization capacity of the unit is determined by the amount of heat that can be stored in the water. This is a function of the quantity of the water and the maximum permissible temperature drop as the carbon dioxide passes through the heat exchange medium. The rate of vaporization is a function of the size of the coiled conduit portion. A pneumatically powered mixer 30 (FIG. 2) which is operatively connected to and driven by pressure in an outlet conduit portion 24' may be used to agitate the water. A set of propellors 31 are attached to the mixer to provide maximum heat exchange efficiency between the water and the coiled conduit 22'. The water could also be agitated by an electrically operated stirring device or by bubbling carbon dioxide from the system into the water.

When the gas is stored at high pressure as in the cylinders 10, the system takes advantage of the fact that as the water temperature drops, so does the pressure in the cylinders and less heat must be added to the liquid in order to vaporize it.

The gas is delivered from the coiled portion 22 of the conduit at an increased temperature and reduced pressure to distribution means, such as a diffuser nozzle 26, through an outlet conduit portion 24. The distribution means provides rates and velocities of vapor discharge for total flooding and/or direct application. It should be noted that the liquid carbon dioxide which flows from the cylinders is completely vaporized and heated before it is discharged into the hazard. The nozzle 26 injects the carbon dioxide vapor into a cabinet 28 near its bottom portion with minimum velocity and turbulence. This invention is particularly useful for extinguishing fires in cabinets containing delicate electronic components, such as those comprising computers. The cabinet is flooded to a high concentration of carbon dioxide with a sufficient vapor flow rate to replace any leakage loss from ventilating louvers 29 in the cabinet. In normal operation of the equipment, air is frequently forced into the cabinet and vented through the louvers to remove heat created while the electronic components are operating. By flooding within an affected cabinet only, optimum protection of the electronic equipment is provided with minimum interference to operating personnel. Further, by discharging the carbon dioxide vapor at low velocity and at an elevated temperature, no measurable temperature change is produced on the equipment. It has been found that carbon dioxide concentrations in excess of 80% in the cabinet containing the electronic equipment will extinguish fires in the equipment with a soaking time of approximately two or three minutes. The discharge of carbon dioxide vapor must continue during the entire soaking period, since the inert atmosphere falls away shortly after discharge stops.

The final outlet pressure at the nozzle 26 may be controlled by various means, such as with a pressure regulating valve 32. A dual temperature and pressure ratio control 34 (FIGURE 2) may be connected to the outlet portion 24' of the conduit for operating a liquid carbon dioxide control valve 36 which is operatively connected to the conduit 12'. In this way the degree of super heat in the carbon dioxide vapor leaving the nozzle is controlled by regulating the flow of liquid carbon dioxide into the coiled portion of the conduit. The temperature of the vaporized carbon dioxide is held to a constant selected range after expansion to atmospheric pressure by controlling the temperature of the vaporizing carbon dioxide along a line of constant enthalpy. The system may be operated on pneumatic principles by using the pressure of the medium itself to open valves and operate switches and accessories.

In operating the system, a preselected number of cylinders 10 are connected to the manifold 11. The water in the heat exchange reservoir 14 is brought up to the desired operating temperature in order to provide a ready heat sink. Once the water is heated, little energy is required to maintain the water at this temperature so that it is available for emergency use in exchanging heat with the liquid carbon dioxide as it is being piped through the water for application to the hazard. The pipe coil in the heat sink is sized for length and surface area so as to provide a desired flow rate and pressure drop as the carbon dioxide passes through the pipe. These factors also effect the thermodynamics of the gas. During its passage through the heated water in the reservoir, the carbon dioxide is vaporized. Upon discharge of the gas near the fire source, the carbon dioxide dilutes the oxygen in the atmosphere so that the fire can no longer be supported. Heating the vapor prevents subcooling of the objects which are contacted by it.

As the pressure in the supply tank decreases, the temperature of the liquid carbon dioxide decreases. Simultaneously the latent heat of the heater in the sink goes down because it is cooled by the carbon dioxide passing through the coils. However, since both temperatures are simultaneously decreasing, the efficiency of the system remains substantially constant.

The carbon dioxide in the cylinders may be stored under either high pressure or low pressure. When high pressure storage is employed in the system, slightly more than 100 Btu./lb. are required to produce vaporized carbon dioxide at atmospheric pressure and at a temperature of 70° F. To reach the same end points with gas stored at low pressure, nearly 150 Btu./lb. are required. The greatest amount of the heat, in both cases, is required to effect the change of the carbon dioxide from its liquid state to its gaseous or vapor state. Experience has shown that this vaporization must be accomplished in a period of 1 to 5 minutes to provide adequate fire protection. Although directly applied electrical power could possibly be used to heat and vaporize the flowing gas, it would be impractical because of the speed at which the liquid must be vaporized, even without questioning the availability of electrical power in an emergency. Both the heat source and speed problems are circumvented by using the stored heat vaporizing system of this invention. The hot water is capable of storing all of the heat required for complete vaporization of the carbon dioxide.

The concentration of carbon dioxide produced by this invention in ventilated electronic equipment cabinets amounts to practically a complete displacement of the air by the carbon dioxide vapor. Since the vapor is heavier than air it can leak out of any openings in the bottom of the cabinet. However, if it is injected into the cabinet at a faster flow rate than it leaks out, it fills the cabinet and overflows from any openings or louvers in the cabinet such as in the top. The result is an almost complete inerting, rather than a mere diluting, of the oxygen content of the atmosphere within the cabinet. The vapor temperature can also be controlled by modifying the apparatus to by-pass a controlled portion of the liquid carbon dioxide into the conduit containing the vaporized gas, as by means of a conventional bypass valve 40 between a conduit 12a branching from the conduit 12 and a conduit 24a branching from the conduit 24.

Thus, it will be appreciated that all of the recited objects, advantages and features of this invention have been demonstrated as obtainable in a highly practical system and one that is not only simple and positive in operation, but also inexpensive to manufacture and maintain. It will be further understood that although the invention has been described with respect to certain specific embodiments thereof, it is to be understood that this invention is not limited thereto, since various modifications of said invention will suggest themselves from the aforesaid description.

I claim:

1. Apparatus for extinguishing fires comprising: means for storing a supply of liquid carbon dioxide; a conduit for piping the carbon dioxide from the storing means to means for distributing vaporized carbon dioxide gas about a fire source; said conduit having one end connected to the storing means and another end connected to the distributing means; heat exchange means for storing heat in a heat exchange medium and for heating and vaporizing the liquid carbon dioxide into its gaseous vapor state by transferring heat from the heat exchange medium to the carbon dioxide while the carbon dioxide passes through the conduit between said ends and means for agitating the heat exchange medium to increase heat transfer efficiency beween the heat exchange medium and the carbon dioxide in the conduit; said heat exchange means surrounding at least a portion of the conduit between the storing means and the fire source and maintaining the heat transfer medium in heat transferring relation to said portion of the conduit.

2. Apparatus for extinguishing fires comprising: means for storing a supply of liquid carbon dioxide; a conduit for piping the carbon dioxide from the storing means to means for distributing vaporized carbon dioxide gas about a fire source; said conduit having one end connected to the storing means and another end connected to the distributing means; heat exchange means for heating and vaporizing the liquid carbon dioxide into its gaseous vapor state while the carbon dioxide passes through the conduit between said ends; said heat exchange means surrounding at least a portion of the conduit between the storing means and the fire source; said heat exchange means comprising a reservoir of heated water; and the portion of the conduit surrounded by the heat exchange means being of a length and surface area to completely vaporize the liquid carbon dioxide.

3. The apparatus as claimed in claim 2 further comprising means for agitating the water to increase heat transfer efficiency between the water and the carbon dioxide in the conduit.

4. Apparatus as claimed in claim 3 further comprising means for controlling the discharge vapor temperature and pressure by reducing the pressure of the liquid carbon dioxide being supplied to the portion of the conduit surrounded by the heat exchange means.

5. A method of extinguishing fires with carbon dioxide comprising: maintaining a supply of liquefied carbon dioxide; initiating flow of the liquid carbon dioxide upon detecton of a burning fire source; piping the liquefied carbon dioxide through a heat exchange reservoir containing a heat exchange medium; vaporizing the carbon dioxide being piped through the reservoir into its gaseous vapor state before the carbon dioxide vapors leave the reservoir by transferring heat from the heat exchange medium to the carbon dioxide while agitating the heat exchange medium to increase heat transfer efficiency between the heat exchange medium and the carbon dioxide in the conduit; and surrounding the burning fire source with the vaporized carbon dioxide.

6. The method as claimed in claim 5 further comprising the step of controlling the temperature of the vaporized carbon dioxide along a line of constant enthalpy for providing a constant discharge temperature after expansion of the gas to atmospheric pressure.

7. The method as claimed in claim 5 further comprising the step of by-passing a portion of the liquid carbon dioxide into the vaporized carbon dioxide.

References Cited
UNITED STATES PATENTS

| | | | |
|---|---|---|---|
| 2,207,662 | 7/1940 | Edmundson | 169—11 |
| 3,403,733 | 10/1968 | Terry | 169—12 X |
| 2,706,527 | 4/1955 | Guljas et al. | 169—4 |
| 2,730,178 | 1/1956 | Risinger | 169—1 |
| 3,019,843 | 2/1962 | Powell | 169—4 X |

M. HENSON WOOD, Jr., Primary Examiner

MICHAEL Y. MAR, Assistant Examiner

U.S. Cl. X.R.

169—2, 11